United States Patent
Sikorski et al.

[11] Patent Number: 5,951,254
[45] Date of Patent: Sep. 14, 1999

[54] BLADE FOR FLUID FLOW ENGINE HAVING A METALLIC COATING LAYER, AND METHOD OF MANUFACTURING AND REPAIRING THE SAME

[75] Inventors: Siegfried Sikorski; Michael Schober; Reinhold Schoenacher, all of Munich, Germany

[73] Assignee: MTU Motoren- und Turbinen- Union Muenchen GmbH, Munich, Germany

[21] Appl. No.: 08/891,853

[22] Filed: Jul. 9, 1997

[30] Foreign Application Priority Data

Jul. 11, 1996 [DE] Germany .................. 196 27 860

[51] Int. Cl.$^6$ ............................ F04D 29/38
[52] U.S. Cl. .................. 416/224; 416/230; 416/241 R
[58] Field of Search ............ 415/266; 416/224, 416/241 R, 241 A, 229 R, 229 A, 230; 264/113, 122, 257

[56] References Cited

U.S. PATENT DOCUMENTS

| | | |
|---|---|---|
| 3,762,835 | 10/1973 | Carlson et al. . |
| 3,923,945 | 12/1975 | Humphries ................ 264/111 |
| 3,966,353 | 6/1976 | Booher, Jr. et al. . |
| 4,037,751 | 7/1977 | Miller et al. ............ 416/229 R |
| 4,269,800 | 5/1981 | Sommer et al. ............ 264/111 |
| 4,327,154 | 4/1982 | Rossmann . |
| 4,492,522 | 1/1985 | Rossmann et al. . |
| 4,629,397 | 12/1986 | Schweitzer . |
| 4,966,527 | 10/1990 | Merz . |
| 5,174,024 | 12/1992 | Strrett .................... 416/224 |
| 5,308,228 | 5/1994 | Benoit et al. ............ 416/230 |
| 5,324,544 | 6/1994 | Spence et al. .......... 416/241 R |
| 5,326,647 | 7/1994 | Merz et al. ............. 415/174.5 |
| 5,380,152 | 1/1995 | Sikorski et al. . |
| 5,547,769 | 8/1996 | Schmitz ............... 416/241 R |
| 5,632,602 | 5/1997 | Herrmann et al. ........... 416/230 |

FOREIGN PATENT DOCUMENTS

| | | |
|---|---|---|
| 0526057 | 2/1993 | European Pat. Off. . |
| 0596386 | 5/1994 | European Pat. Off. . |
| 2303089 | 10/1976 | France . |
| 2375441 | 7/1978 | France . |
| 2631856 | 2/1977 | Germany . |
| 4208842 | 4/1993 | Germany . |
| 4343904 | 6/1995 | Germany . |
| 9600842 | 1/1996 | WIPO . |

*Primary Examiner*—Edward K. Look
*Assistant Examiner*—Richard Woo
*Attorney, Agent, or Firm*—W. F. Fasse; W. G. Fasse

[57] ABSTRACT

A blade for a fluid flow machine such as a jet turbine engine includes a blade body (2) that is to be exposed to the fluid flow and therefore is subject to damage by erosion due to abrasive particle entrained in the fluid flow and due to thermal loading. The blade body (2) is a layered body including base layers (6) of a fiber reinforced synthetic material and a metallic cover layer (7) applied as an erosion protective layer onto at least a portion or the entirety of the surface of the base layers (6). The cover layer (7) includes metallic fibers or threads (9A, 9B) which are bonded with the fiber reinforced synthetic material of the adjacent base layers (6) by the same synthetic resin binder material permeating through and forming a matrix for all the layers (6 and 7). The metallic fibers or threads (9A, 9B) embedded in a synthetic resin matrix are characterized by a high degree of erosion resistance and a good tolerance for defects in the case of local impact or erosion damage. The blade may be a blade of a fan or compressor stage of a jet turbine engine. A method for manufacturing and a method for repairing such blades involves exposing outer layers of fibers of a blade, and applying thereon a cover layer of metallic fibers or threads. An additional outer protective layer may be applied on the cover layer.

30 Claims, 2 Drawing Sheets

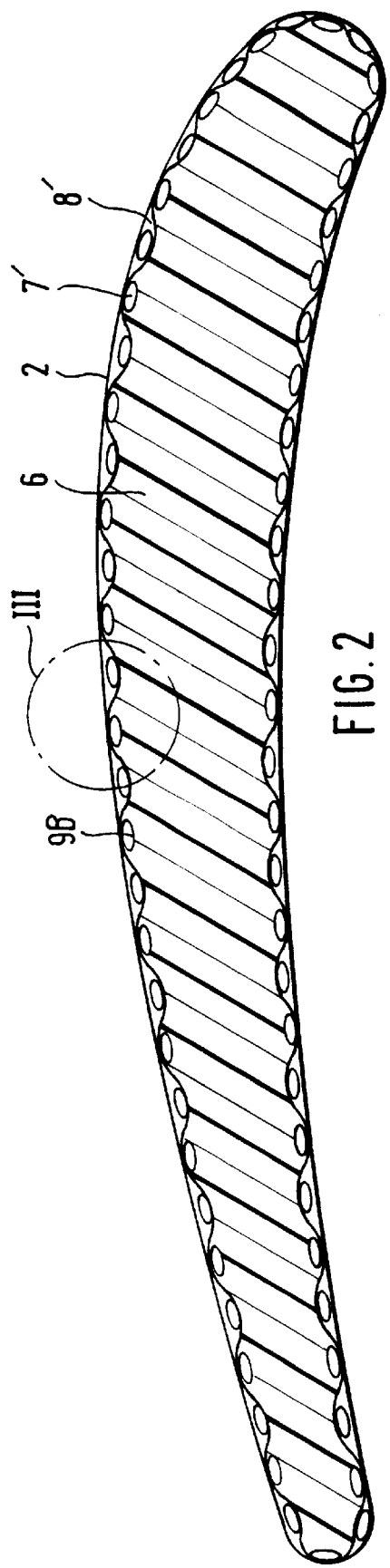
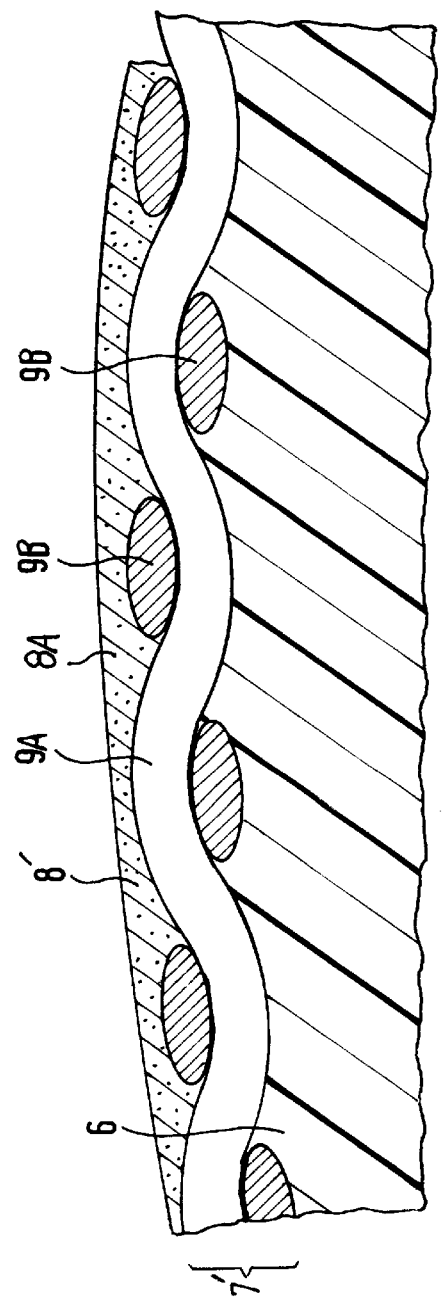

BLADE FOR FLUID FLOW ENGINE HAVING A METALLIC COATING LAYER, AND METHOD OF MANUFACTURING AND REPAIRING THE SAME

FIELD OF THE INVENTION

The invention relates to a blade for a fluid flow machine, such as a jet turbine engine, having a blade body constructed of layers of a fiber reinforced synthetic material, and a metallic coating layer that is applied to at least a portion of the surface or over the entire surface of the blade body for providing protection against erosion effects. The invention further relates to a method for manufacturing and repairing such a blade.

BACKGROUND INFORMATION

Components of fluid flow engines, and particularly the blades thereof, which are made of fiber reinforced synthetic composite materials and which are exposed to the fluid flow within the engine, are subjected to dangerous erosion effects caused by abrasive particles in the fluid flow and by thermal load effects. In order to protect components of an engine, German Patent Laying Open Publication DE-OS 4,343,904 proposes to apply an erosion resistant inorganic lacquer coating onto the respective components. This known method has the advantage that it is relatively easy and cheap to apply and fire the lacquer coating onto the components, even as a repair method for used components. However, the reliability or durability of the adhesion of the lacquer coating onto the components has been found to be problematic, so that it may be necessary to repeat the application of the lacquer coating during the operating lifetime of the component. This increases the overall costs of the known method, and also entails an increased effort for inspection and maintenance.

As a further alternative, German Patent Publication DE-PS 4,208,842 describes an erosion protection for helicopter rotor blades made of fiber reinforced synthetic materials, wherein the critical locations of the rotor blade are covered or coated by a sheet metal member that is glued or otherwise adhered onto the surface of the rotor blade. Moreover, the sheet metal member is coated with particles of metallic compounds. In this case once again, the problem arises that the reliability or durability of the adhesion of the glued-on sheet metal with the underlying fiber composite structure is inadequate.

In order to protect composite blades against high impact loads, German Patent Publication DE 2,631,856 suggests a leading edge protection consisting of a wire mesh that is anchored in the fiber composite material of the main structure of the blade body. However, it is a disadvantage that such wire meshes have a relatively coarse mesh size, as limited by the minimum diameter of the wires that are used to make the mesh. Due to this relatively coarse mesh, the primary applicability of this known solution is to provide protection from the impact of relatively large foreign bodies, such as birds for example. Smaller foreign bodies can still penetrate and cause erosion of the fiber composite material in the coarse mesh spaces between the individual wires. Thus, this known solution is not very well suited for providing protection against erosion from sand and the like, for example.

U.S. Pat. No. 3,762,835 describes a further means for protecting the leading edges of composite blades, and particularly in relation to providing a foreign body impact protection for compressor blades. According to this patent, a layer of a fine wire mesh or net is arranged under the surface and extends over and around the leading edge of a fiber composite material compressor blade. This fine wire net layer arranged under the surface is coated with nickel and forms a protective layer against impact damage caused by large and small foreign bodies, such as stones and sand. If the net or mesh layer arranged under the surface is fixed by means of a non-sliding adhesive, the adhesive material in the interspaces of the net or mesh is coated with silver, and the adhesive material is bonded by means of atomic bonding with the nodes or knots of the net or mesh, which thus forms a metallic strip.

However, in individual cases in which the leading edges of blower or fan blades were provided with a foreign body impact and erosion protection comprising such metallic strips extending over and around the leading edges, it has been discovered in practice that the metallic strips can become at least partially delaminated or defoliated and removed from the blades, as a result of strikes or impacts by middle-sized birds. As a consequence, the protection is at least partially lost, and further damage of the fiber layers of the blades can no longer be prevented.

SUMMARY OF THE INVENTION

In view of the above, it is an object of the invention to provide a blade structure for a fluid flow machine such as a jet turbine engine, including a blade body constructed of layers of fiber reinforced synthetic material, which avoids the above discussed disadvantages of the prior art. More particularly, the invention especially aims to achieve a high erosion resistance for the blade structure, in combination with a reliable and durable adhesion of the erosion protection means onto the blade body. It is a further object of the invention to provide a method of manufacturing and repairing such blades made of fiber reinforced synthetic composite materials, so as to achieve a durable and reliable erosion protection for the blades.

The above objects have been achieved in a blade structure according to the invention, wherein a blade body comprises layers of a fiber reinforced synthetic material in a synthetic resin matrix material, and a metallic cover layer is surfacially applied as an erosion protection onto at least a portion or the entirety of the surface of the blade body. Preferably, the cover layer comprises a felt or fleece having metallic fibers or threads, which is connected and bonded to the adjacent layers of fiber reinforced synthetic material using the same synthetic resin matrix or binder material as in the blade body.

By using metallic fibers or threads as the basis for the cover layer, the invention achieves the advantage that these threads or fibers on the one hand provide a high erosion resistance, and on the other hand provide a certain tolerance for errors, defects, or damage, due to the great number of fibers or threads that are interconnected with one another. Thus, in the event of a local damaging of the cover layer, a spontaneous or self-actuated spreading or enlargement of the damage, as is the case with sheet metal parts or wire meshes used as protective members, or a delaminating and removal of the cover layer, can be prevented. The use of the very same synthetic resin matrix or binder material, which binds together the layers of the fiber reinforced synthetic material as well as the cover layers with one another, ensures that the cover layers have a very high adhesion onto the underlying base layers of the blade body. Moreover, due to the electrical conductivity of the metallic fibers or threads, the inventive structure provides an inherent protection against lightning strikes and other atmospheric electrical discharges, as is desirable for rotor blades or propellers.

A particularly effective protection against erosion, especially in relation to small particles such as sand, is achieved by embodying the cover layer from a felt made of metallic fibers or threads having a rather fine diameter that is typically in the micron range. It should be understood that threads are typically longer than fibers, or have a greater length-to-diameter aspect ratio. Fibers are particularly suitable for forming a felt, in which the fibers are non-oriented, are not interconnected directly with each other but rather are bonded by the resin binder material, and are relatively short so that they do not extend entirely through an extension dimension of the layer. Threads may also be used to make a felt, but are particularly suited to making a fabric layer, in which at least some of the threads extend continuously through and along the layer entirely across an extension dimension thereof, and in which at least some of the threads may be interconnected by weaving, tying, knotting, braiding, knitting, twisting, interneedling or heat-fusing. A felt may also be constructed with at least some of the fibers or threads interconnected in any such manner. The threads or fibers of the cover layer may also be interconnected with the reinforcement fibers of the blade body in any such manner.

A further advantage of the present metallic felt is that the non-oriented or non-directed fiber strands in the resulting fiber composite allow any felt fibers that are impacted by a foreign body to be deflected elastically, so that the danger of fiber rupture is reduced. However, if a fiber rupture nonetheless results due to a rather serious foreign body impact, the damage will be locally limited, since the individual fibers of the felt each respectively have limited lengths, and do not extend through the entire length or width of the layer as would be the case in a woven web or mesh.

The present metallic felt is further distinguishable from a woven web or mesh in that it does not have an oriented or directed roughness or texture, as is necessarily caused in a woven web or mesh due to the continuous, oriented fibers therein. Thus, the present coating layer avoids a negative influence on the aerodynamic characteristics of the blade, and especially the leading edge of the blade, for which an oriented roughness or texture would be disadvantageous, especially for certain angles of attack of the blade.

The fiber diameter of the fibers typically used in the metal felt is in the range from 2 to 22 $\mu$m or more narrowly in the range from 5 to 10 $\mu$m, so that the resulting erosion protection can be embodied in an optimal manner respectively depending upon the application requirements of the particular fluid flow machine. Similarly, the porosity of the felt can be adapted to the respective application requirements, and is especially selected in the range from 70 to 98% porosity or especially 80 to 95% porosity.

According to further details of the invention, the fibers of the felt are preferably steel or nickel fibers, and the synthetic resin forming the matrix and binder material for the coating layer and for the layers of the fiber reinforced synthetic is a copolymer synthetic resin, and especially may contain epoxy resin, phenolic resin, or polyimides. The fibers or threads of the cover layer are preferably interconnected with the fibers of the fiber reinforced synthetic layers by weaving, tying, braiding, or the like. The cover layer is preferably from 0.05 mm to 3 mm thick, and may further be covered by an outer protective layer of a high temperature resistant lacquer or a thermoplastic film, which may contain fine metallic compound particles.

The above objects are further achieved in a method for manufacturing a blade of the above mentioned type, according to the invention, including the following steps. First, layers of the base and cover layers are laid-up on a component form, whereby the cover layer is laid-up on the surface. Then, the layers are impregnated with a synthetic resin, whereupon the layered body is cured and hardened. Next, the outermost metallic fibers or threads are exposed, and the outer protective layer is applied onto the exposed fibers or threads of the cover layer.

The method according to the invention is characterized by the advantageous result of a high level of durable and reliable adhesion of the protective layer onto the metallic fibers or threads of the cover layer, while utilizing a relatively low amount of process technical effort. By exposing the outer threads or fibers of the cover layer, especially by using particle beams, the method simultaneously achieves a certain surface roughness that further improves the adhesion of the protective layer onto the cover layer.

The above objects relating to repairing a blade are achieved according to the invention, involving a first step of partial or complete surfacial exposure of the outermost fiber layers of the blade body and associated roughening of the surface, a next step of applying at least one cover layer comprising metallic fibers or threads, and then bonding together the synthetic resin saturated layers of the layered body by subjecting the layered body to pressure and heat treatment in an appropriate form. According to particular details of the invention, the cover layer may be a so-called prepreg that is pre-impregnated with a synthetic resin. Furthermore, a mechanical operation, such as a machining operation, may be carried out before or during the step of exposing the outermost fiber layer in order to remove erosion induced defects or damaged areas.

By means of the repair method according to the invention, it is possible to provide a cover layer having metallic fibers or threads on preexisting blades of fluid flow machines that had previously been manufactured according to the state of the art as layered bodies. In this manner, the erosion resistance of the blades can be repaired or even improved with only a small effort and expense.

BRIEF DESCRIPTION OF THE DRAWINGS

In order that the invention may be clearly understood, it will now be described in connection with example embodiments, with reference to the accompanying drawings, wherein:

FIG. 2 is a cross-section through the blade body of another embodiment of a blade according to the invention; and FIG. 3 is an enlarged detail view of the area III in FIG. 2.

Figure 1:
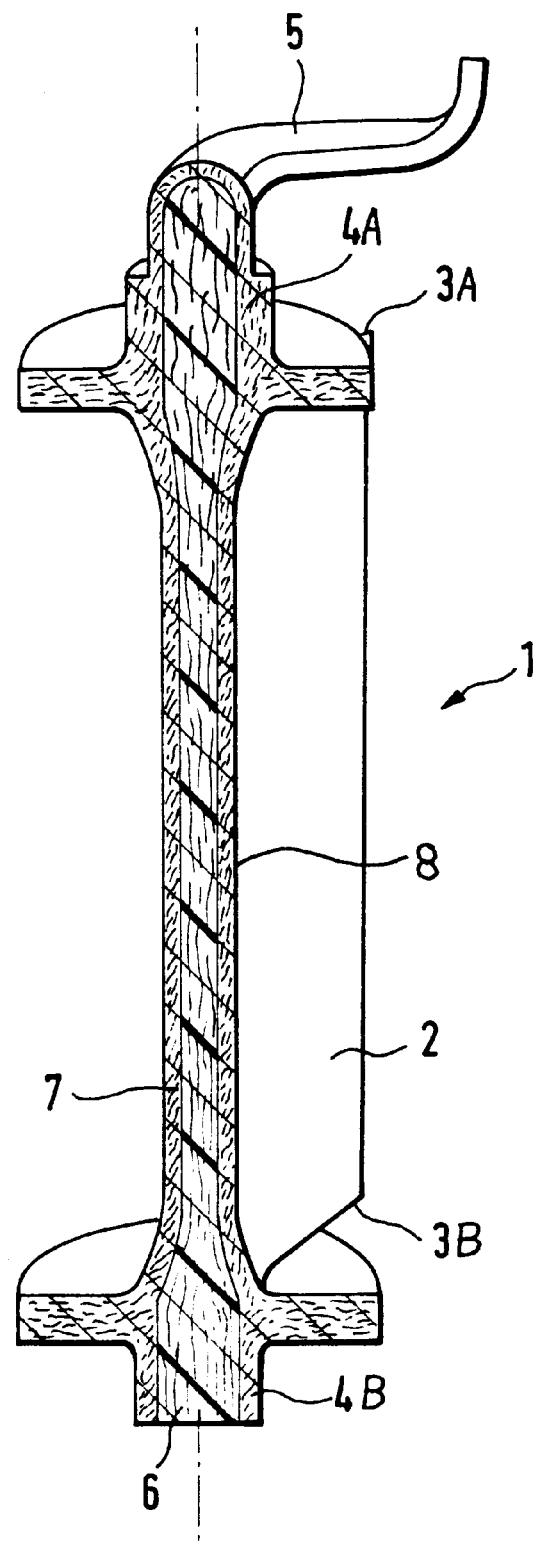
FIG. 1 is a lengthwise section through a blade according to a first embodiment of the invention, in a fluid flow machine, for example a guide vane blade in a jet turbine engine.

DETAILED DESCRIPTION OF PREFERRED
EXAMPLE EMBODIMENTS AND OF THE
BEST MODE OF THE INVENTION

The blade 1 shown in FIG. 1 is an adjustable guide vane for the compressor of a fluid flow machine such as a jet turbine, which is not shown. The blade 1 is embodied throughout as a layered body, and comprises a blade body 2 as well as two bearing journals 4A and 4B arranged opposite one another along the edges 3A and 3B of the blade body 2. In the construction of the jet turbine, the blade 1 is rotatably adjustably mounted by its bearing journals 4A and 4B. Extending from one of the bearing journals 4A is a bent or angled adjustment lever 5, which is similarly embodied in a layered construction. The entire blade 1, may thus have a unitary or integral construction.

The layered body 2 of the blade 1 is formed of an inner core comprising base layers 6 of a fiber reinforced synthetic material and a metallic cover layer 7 applied surfacially over the entire surface of the base layers 6. In order to complete the erosion protection, the layered body is further provided with an additional outer protective layer 8 that is coated over the cover layer 7. The protective layer 8 may be a high temperature resistant lacquer coating or a thermoplastic film, and may contain fine metallic compound particles 8A as shown in the protective layer 8' of FIG. 3. Since the protective layer 8 fills out and smoothes over any depressions or non-uniformities in the cover layer 7, the outermost surface is improved to be very smooth.

The cover layer 7 of the layered body forming the blade 1 in the example embodiment shown in FIG. 1 is formed by a fleece or felt of nickel fibers having a porosity of approximately 95%. The base layers 6 arranged under the cover layer 7 comprise carbon fiber reinforced synthetic material. The matrix for the layered body, namely for the cover layer 7 as well as for the base layers 6 is a synthetic resin binder material, preferably an epoxy resin in this embodiment. Due to this unitary through-going matrix, an intensive and very well adhering bond between the fibers of the cover layer 7 and the fibers of the base layers 6 is achieved, with a substantially homogeneous strain characteristic throughout. By further providing the protective layer 8 and adding finely divided particles of a metal oxide compound therein, it is possible to even further improve the erosion resistance characteristics.

In comparison to the first embodiment shown in FIG. 1, the structure and construction of the blade of the second embodiment shown in FIGS. 2 and 3 is generally similar, and a redundant description is omitted, except for the following distinctions. The cover layer 7' is formed by a fabric layer 7' that is represented for example by a woven web of metallic threads 9A and 9B, whereby the weft threads 9A run along in the plane of the drawing of FIG. 3, and the warp threads 9B extend perpendicularly to the plane of the drawing. The fabric layer 7' has threads 9A and 9B that are interconnected by weaving as illustrated, or in any other manner as described herein. The woven web 7' of metallic threads has certain advantages and certain disadvantages in comparison to the felt 7 made up of non-oriented or random fibers, as discussed above. The outer protective layer 8' particularly contains finely divided and distributed particles 8A of a metal oxide compound.

A blade 1 of the first or the second embodiment can be manufactured according to the following example. First, the base layers and the cover layers are laid-up in a layer-wise fashion into a component form, such that the cover layers come to lie on the outer surface. The layered body is then closed and locked into its component form, saturated and impregnated with a phenolic resin, and then cured. Subsequently, the resulting semi-finished product is removed from the form and the outermost fibers or threads of the cover layer are exposed by directing a particle beam at the surface, and simultaneously the surface is roughened. Finally, the outer protective layer containing finely distributed metal particles is applied by means of a flame spraying process onto the surface of the layered body that has been prepared in the above described manner.

A blade that has been damaged, for example by erosion, can be repaired by first exposing the outer fiber layers of the layered body in the area of the erosion damaged locations by means of particle beams. Next, a cover layer of metallic fibers or threads as described above is applied onto the exposed fiber layers. More specifically, the applied metallic fibers or threads may be a prepreg felt or woven web that is pre-impregnated with a synthetic resin. The layered body that has been pre-treated in this manner is then placed into an appropriate form, and is then formed and cured by means of pressure and heat treatment. Finally, an outer protective layer may be applied onto the coating layer. In any case where necessary, before the step of exposing the fiber layers, one or more fiber layers may be removed or machined down, to avoid thickening the blade body 2 through the application of the cover layer and protective layer, which would result in an undesired variation of the aero-dynamic flow characteristics.

Although the invention has been described with reference to specific example embodiments, it will be appreciated that it is intended to cover all modifications and equivalents within the scope of the appended claims. It should also be understood that the present disclosure extends to all intercombinations of any features recited in any of the appended claims.

What is claimed is:

1. A blade for a fluid flow machine comprising a blade body adapted to be exposed to a fluid flow in said fluid flow machine, wherein said blade body comprises a body core and an erosion protection cover layer arranged on at least a portion of a surface of said body core, wherein said body core comprises layers of reinforcement fibers and a synthetic resin binder material binding together said reinforcement fibers, and wherein said cover layer comprises metallic fibers or metallic threads and the same said synthetic resin binder material binding together said metallic fibers or metallic threads and bonding said cover layer onto said body core.

2. The blade according to claim 1, wherein said cover layer is arranged on the entirety of said surface of said body core.

3. The blade according to claim 1, wherein said synthetic resin binder material forms an integral unitary matrix for said reinforcement fibers of said body core and for said metallic fibers or metallic threads of said cover layer.

4. The blade according to claim 3, expressly excluding any additional handing between said cover layer and said body core.

5. The blade according to claim 3, wherein said reinforcement fibers of said body core are non-metallic fibers.

6. The blade according to claim 1, wherein said reinforcement fibers of said body core are non-metallic fibers.

7. The blade according to claim 6, wherein said reinforcement fibers of said body core are carbon fibers.

8. The blade according to claim 1, wherein said synthetic resin binder material comprises a synthetic resin copolymer.

9. The blade according to claim 8, wherein said synthetic resin copolymer comprises at least one of epoxy resin, phenolic resin and polyimide.

10. The blade according to claim 1, wherein said cover layer comprises a felt of said metallic fibers or said metallic threads.

11. The blade according to claim 10, wherein said felt comprises said metallic fibers, wherein said fibers are non-oriented, are not interconnected directly with each other, and have lengths shorter than an extension dimension of said cover layer such that respective ones of said fibers do not extend entirely across said extension dimension of said cover layer.

12. The blade according to claim 10, wherein said felt has a porosity in the range from 70% to 98%.

13. The blade according to claim 10, wherein said felt comprises said metallic fibers, and wherein said metallic fibers comprise at least one of steel fibers and nickel fibers.

14. The blade according to claim 1, wherein said cover layer comprises a fabric layer of said metallic threads, wherein said metallic threads are interconnected with one another by one of tying, knotting, knitting, twisting and heat-fusing.

15. The blade according to claim 14, wherein at least some of said threads extend continuously through and along said fabric layer entirely across an extension dimension thereof.

16. The blade according to claim 14, wherein at least some of said metallic threads of said cover layer are interconnected with at least some of said reinforcement fibers of said body core by one of weaving, tying, knotting, braiding, knitting, twisting, inter-needling, and heat-fusing.

17. The blade according to claim 10, wherein at least some of said metallic fibers or metallic threads of said felt of said cover layer are interconnected with at least some of said reinforcement fibers of said body core by one of weaving, tying, knotting, braiding, knitting, twisting, interneedling and heat-fusing.

18. The blade according to claim 1, wherein said metallic fibers or said metallic threads have a diameter in the range from 2 μm to 22 μm.

19. The blade according to claim 1, wherein said cover layer has a thickness in the range from 0.05 mm to 3 mm.

20. The blade according to claim 1, wherein said blade body further comprises an erosion resistant protective layer coated onto at least a portion of a surface of said cover layer.

21. The blade according to claim 20, wherein said protective layer is coated onto the entirety of said surface of said cover layer.

22. The blade according to claim 20, wherein said protective layer comprises a high temperature resistant lacquer.

23. The blade according to claim 20, wherein said protective layer comprises a thermoplastic film.

24. The blade according to claim 20, wherein said protective layer comprises metallic particles.

25. The blade according to claim 24, wherein said metallic particles comprise a metal oxide compound.

26. A method for manufacturing said blade for a fluid flow machine according to claim 20, comprising the following steps:

(a) forming a layered body by laying-up at least one core layer of said reinforcement fibers and at least one said cover layer of said metallic fibers or metallic threads into a form, such that said cover layer is on a surface of said at least one core layer;

(b) impregnating said layered body including said core layer and said cover layer with said synthetic resin binder material;

(c) curing said impregnated layered body;

(d) exposing outermost ones of said metallic fibers or metallic threads of said cover layer; and (e) applying said erosion resistant protective layer onto said exposed outermost ones of said metallic fibers or metallic threads of said cover layer.

27. The method according to claim 26, wherein said step (d) comprises using a particle beam for exposing said outermost ones of said metallic fibers or metallic threads.

28. A method of repairing said blade for a fluid flow machine according to claim 1, said method comprising the following steps:

(a) exposing at least an outermost layer of said metallic fibers or metallic threads of said blade body on at least a portion of a surface of said blade body, and roughening said portion of said surface;

(b) applying at least one repair layer of metallic repair fibers or metallic repair threads onto said exposed outermost layer of said metallic fibers or metallic threads;

(c) impregnating at least said exposed outermost layer of said metallic fibers or metallic threads as well as said metallic repair fibers or metallic repair threads of said repair layer with a synthetic resin; and (d) curing said synthetic resin and bonding together said repair layer with and onto said exposed outermost layer of said metallic fibers or metallic threads of said blade body by subjecting said blade body to pressure and heat treatment in a form.

29. The method according to claim 28, wherein said step (b) comprises using as said repair layer a prepreg layer that is pre-impregnated with synthetic resin.

30. The method according to claim 28, further comprising a step of mechanically removing from said blade body defects caused by erosion, before or during said step (a).

* * * * *

UNITED STATES PATENT AND TRADEMARK OFFICE
CERTIFICATE OF CORRECTION

PATENT NO. : 5,951,254

DATED : Sep. 14, 1999

INVENTOR(S) : Sikorski et al.

It is certified that error appears in the above-identified patent and that said Letters Patent is hereby corrected as shown below:

Item [56],
Title Page: under "References Cited
         U. S. PATENT DOCUMENTS",
  line 10, after "12/1992", replace "Strrett" by --Sterrett--;

Col. 6, line 45, after "additional", replace "handing", by --bonding--;

Signed and Sealed this

Seventh Day of March, 2000

*Attest:*

Q. TODD DICKINSON

*Attesting Officer*     *Commissioner of Patents and Trademarks*